United States Patent
Mouri

[11] Patent Number: 5,268,841
[45] Date of Patent: Dec. 7, 1993

[54] APPARATUS FOR ACTIVELY CONTROLLING STEER ANGLE OF FRONT WHEELS OF VEHICLE

[75] Inventor: Hiroshi Mouri, Yokosuka, Japan

[73] Assignee: Nissan Motor Co., Ltd., Yokohama, Japan

[21] Appl. No.: 750,943

[22] Filed: Aug. 28, 1991

[30] Foreign Application Priority Data

Aug. 28, 1990 [JP] Japan ................... 2-224244

[51] Int. Cl.$^5$ ............................... B62D 5/00
[52] U.S. Cl. ................ 364/424.05; 180/141; 180/142
[58] Field of Search .......... 364/424.05; 280/91; 180/79.1, 140–143

[56] References Cited

U.S. PATENT DOCUMENTS

| | | | |
|---|---|---|---|
| 4,690,431 | 9/1987 | Ito et al. | 180/142 |
| 4,718,685 | 1/1988 | Kawabe et al. | 180/142 |
| 4,834,205 | 5/1989 | Mizuno et al. | 180/142 |
| 4,878,557 | 11/1989 | Shibahata et al. | 180/142 |
| 4,893,690 | 1/1990 | Mori et al. | 180/142 |
| 4,947,327 | 8/1990 | Kawagoe | 180/141 |
| 5,018,070 | 5/1991 | Eguchi | 180/141 |
| 5,020,619 | 6/1991 | Kanazawa et al. | 364/424.05 |

*Primary Examiner*—Gary Chin
*Attorney, Agent, or Firm*—Foley & Lardner

[57] ABSTRACT

In an apparatus for actively controlling a steer angle of front wheels of a vehicle in accordance with a steering wheel angle, an active control amount for actively controlling the steer angle of the front wheels is calculated by an equation including a proportional term and a differential term. A coefficient of the differential term is changed in accordance with a lateral acceleration such that it is kept unchanged within a first range in which the cornering power is large, but is increased in a second range in which the cornering power is decreased due to the non-linearity of tires. Thus, the reduction in the cornering power in the second range can be compensated for and the stability and response during the high lateral G turning can be improved.

11 Claims, 5 Drawing Sheets

FIG_1

FIG._5
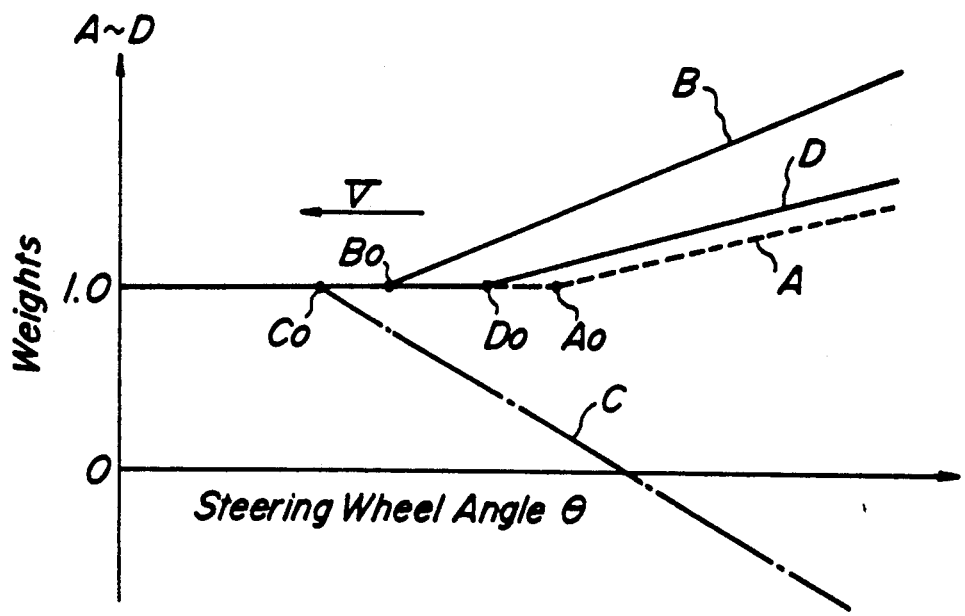
FIG._6
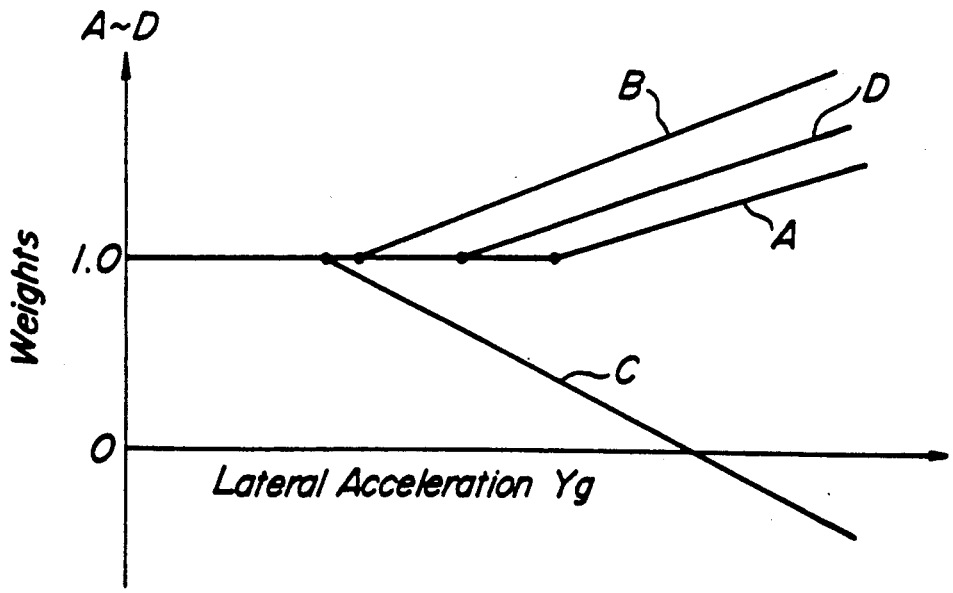

APPARATUS FOR ACTIVELY CONTROLLING STEER ANGLE OF FRONT WHEELS OF VEHICLE

BACKGROUND OF THE INVENTION

Field of the Invention and Related Art Statement

The present invention relates to an apparatus for actively controlling a steer angle of front wheels of a vehicle, and more particularly to an apparatus for actively controlling a steer angle of front wheels of a vehicle in accordance with a steering wheel angle and a running velocity of a vehicle.

There has been proposed an apparatus for controlling a steer angle of front wheels of a vehicle, in which, in addition to a usual control of the front wheels in proportion to a steering wheel angle, the steer angle of the front wheels is auxiliarily controlled in an active manner in accordance with the steering wheel angle, an angular velocity of the steering wheel angle and running velocity of the vehicle. There has been also proposed an apparatus for auxiliarily controlling both the front wheels and the rear wheels in an active manner. The latter apparatus is utilized in a so-called four wheel steering (4 WS) vehicle. For instance, in Japanese Patent Publication Kokai Sho No. 60-161,266, the above mentioned steer angle controlling apparatus is described.

In the known apparatus for actively, controlling the steer angle of front wheels, an active control amount for auxiliarily or actively controlling the steer angle of the front wheels is calculated by applying the steering wheel angle, a differential thereof and running velocity to a predetermined equation including a proportional term and a differential term, and the steer angle of the front wheels is additionally increased by the thus calculated active control amount. This improves the stability and handling properties of the vehicle and creates a new balance of the vehicle. For instance, when the steer angle of the front wheels is increased by the active control amount, upon a turn of the vehicle, a turning characteristic of the vehicle can be improved due to an increase in a yaw rate, i.e. an angular velocity of a yawing movement of a body of the vehicle.

In the known apparatus for controlling the steer angle of the front wheels in the active manner, the active control amount is derived by effecting a calculation based on a fixed equation. Therefore, the active control in a case of changing a steering direction from a straight-ahead direction and the active control in a case of changing the steering direction from a turning movement are carried out in the same manner, because the active control amount is calculated by the same equation without taking into account the driving conditions. Therefore, the variation of the cornering power could not be compensated for.

FIG. 1 shows a relation between a cornering force $C_F$ generated in tires and a slip angle $\beta$. In a range I in which the slip angle $\beta$ is relatively small, there is a substantially linear relationship between the slip angle and the cornering force, but in a range II in which the slip angle is relatively large, a non-linear relationship appears due to the non-linearity of tires. In this manner, the cornering power $C_P$ is not sufficiently increased in the range II, in which a high lateral acceleration (high lateral G) turning is performed. Therefore, when various coefficients in the equation for calculating the active control amount are determined in accordance with the range I in which the linear relationship between the slip angle $\beta$ and the cornering force $C_F$ (cornering power $C_P$) is obtained, these coefficients are not suitable for the non-linear range II which happens when the high lateral G turning and the cornering power of the tires is decreased. In this manner, in the known active control apparatus, the behavior of the vehicle varies greatly, dependent on various driving conditions of the vehicle. In this manner, the known apparatus for controlling the steer angle of the front wheels in the active manner has a drawback that it is difficult to attain a sufficient response, although the stability and handling properties in the above mentioned range I can be improved, so that the head-turning property in the high lateral acceleration turning such as the high speed lane change could not be improved.

SUMMARY OF THE INVENTION

The present invention has for its object to provide a novel and useful apparatus for actively controlling a steer angle of front wheels of a vehicle, in which the active control for the steer angle of the front wheels can be effectively performed under any condition of the cornering power by compensating the variation in the cornering power, and thus the head turning-property under the high lateral acceleration can be improved.

According to the invention, an apparatus for actively controlling a steer angle of front wheels of a vehicle comprises:

first sensing means for detecting a condition of a steering wheel to derive a steering wheel angle signal;

main signal processing means for deriving a main steer angle control signal in accordance with said steering wheel angle signal;

main steering means for steering the front wheels in accordance with said main steer angle control signal;

auxiliary signal processing means for processing said steering wheel angle signal to derive an active steer angle control signal including a proportional component and a differential component; second sensing means for detecting a physical amount corresponding to a lateral acceleration applied to the vehicle;

correcting means for correcting at least a coefficient in an equation for calculating the differential component of said active control signal in accordance with said physical amount corresponding to the lateral acceleration; and auxiliary steering means for controlling the steer angle of the front wheels in accordance with said active control signal corrected by said correcting means.

According to the invention, the coefficient in the equation for calculating the differential component of the active control signal is changed in accordance with the lateral acceleration such that the differential component is increased dependent upon the increase in the lateral acceleration, so that the optimum active control can be performed even in the high lateral acceleration range, and a reduction in the cornering power can be compensated for. Therefore, the decrease in the response and stability during the high lateral acceleration turning motion can be suppressed and the road holding property in the turn-in can be enhanced, while the undesired rotation of the body can be avoided. In this manner, the head-turning property under the high lateral acceleration can be improved to a great extent.

BRIEF DESCRIPTION OF THE DRAWINGS

FIG. 5 is a graph representing an example of a characteristic of weighting coefficients with respect to the steer angle; and FIG. 6 is a graph showing an example of a characteristic of the weighting coefficients for the lateral acceleration.

DESCRIPTION OF THE PREFERRED EMBODIMENTS

Figure 2:
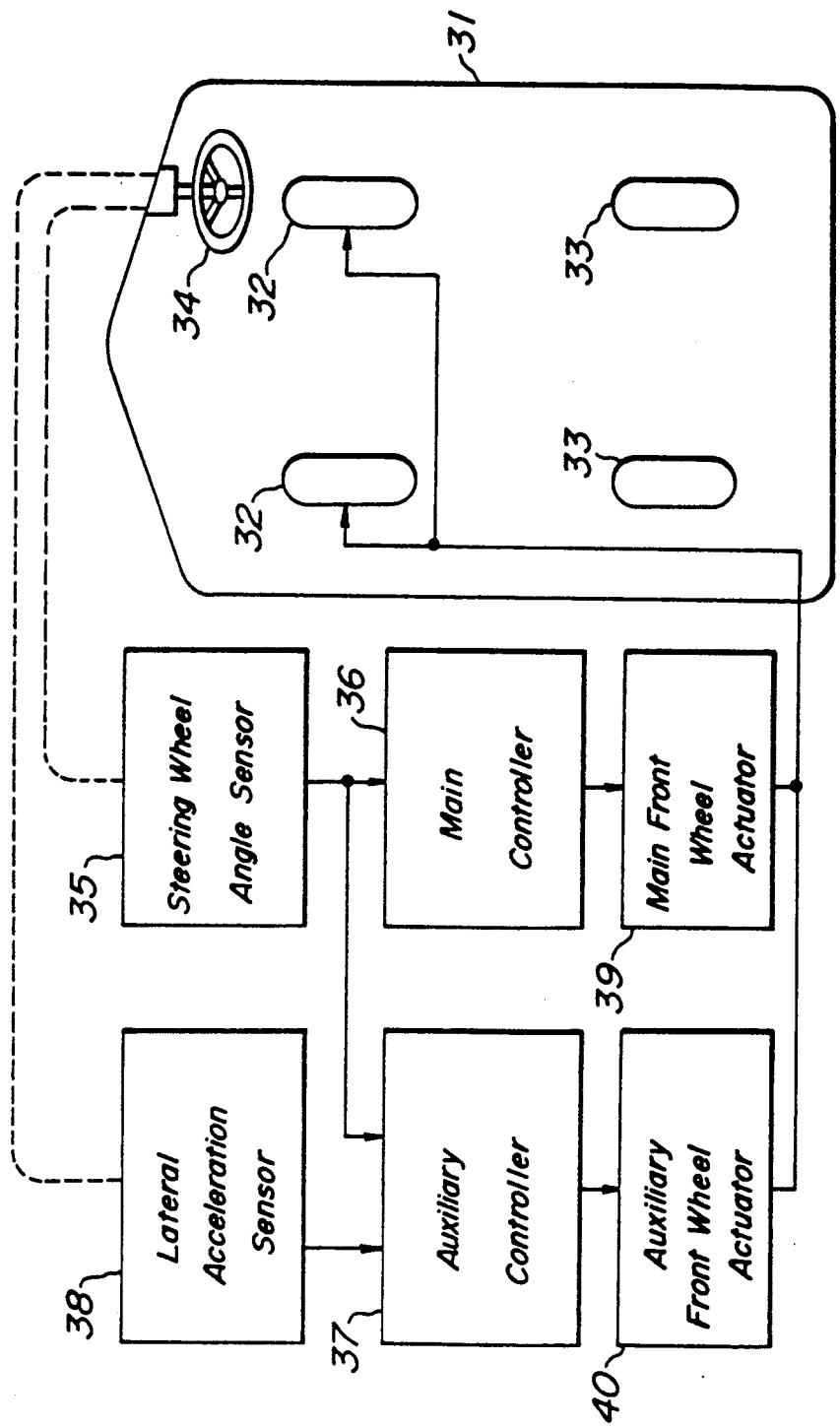
FIG. 2 is a schematic view illustrating a principal construction of the active steer angle control apparatus according to the invention.

FIG. 2 is a schematic view showing the principal construction of the apparatus for actively controlling a steer angle of front wheels of a vehicle according to the invention. A vehicle 31 is illustrated symbolically as having front wheels 32, rear wheels 33 and steering wheel 34. A rotation of a steering wheel 34 is detected by a sensor 35 and a steering wheel angle signal is parallelly supplied to a main controller 36 and an auxiliary controller 37. There is further provided a sensor 38 for detecting a physical amount corresponding to the lateral acceleration applied to the vehicle 31 to derive a lateral acceleration signal, which is supplied to the auxiliary controller 37. In the main controller 36, the steering wheel angle signal is processed in a usual manner to derive a main steer angle control signal, which is then supplied to a main front wheel actuator 39. In the auxiliary controller 37, an active control signal including a proportional component and differential component is first derived from the steering wheel angle signal, and at least a coefficient in an equation for calculating the differential component is corrected in accordance with the lateral acceleration signal such that the coefficient is increased when the lateral acceleration is increased. In this manner, a corrected active control signal is produced by the auxiliary controller 37. The thus produced active control signal is supplied to an auxiliary front wheel actuator 40. In this manner, the steer angle of the front wheels 32 is controlled by both the main actuator 39 and the auxiliary actuator 40. According to the invention, the active control signal for controlling the steer angle of the front wheels 32 is corrected in accordance with the lateral acceleration signal, so that the steer angle of the front wheels 32 can be controlled optimally under various conditions of the cornering power, and thus the turning property under the high lateral acceleration can be improved.

Figure 3:
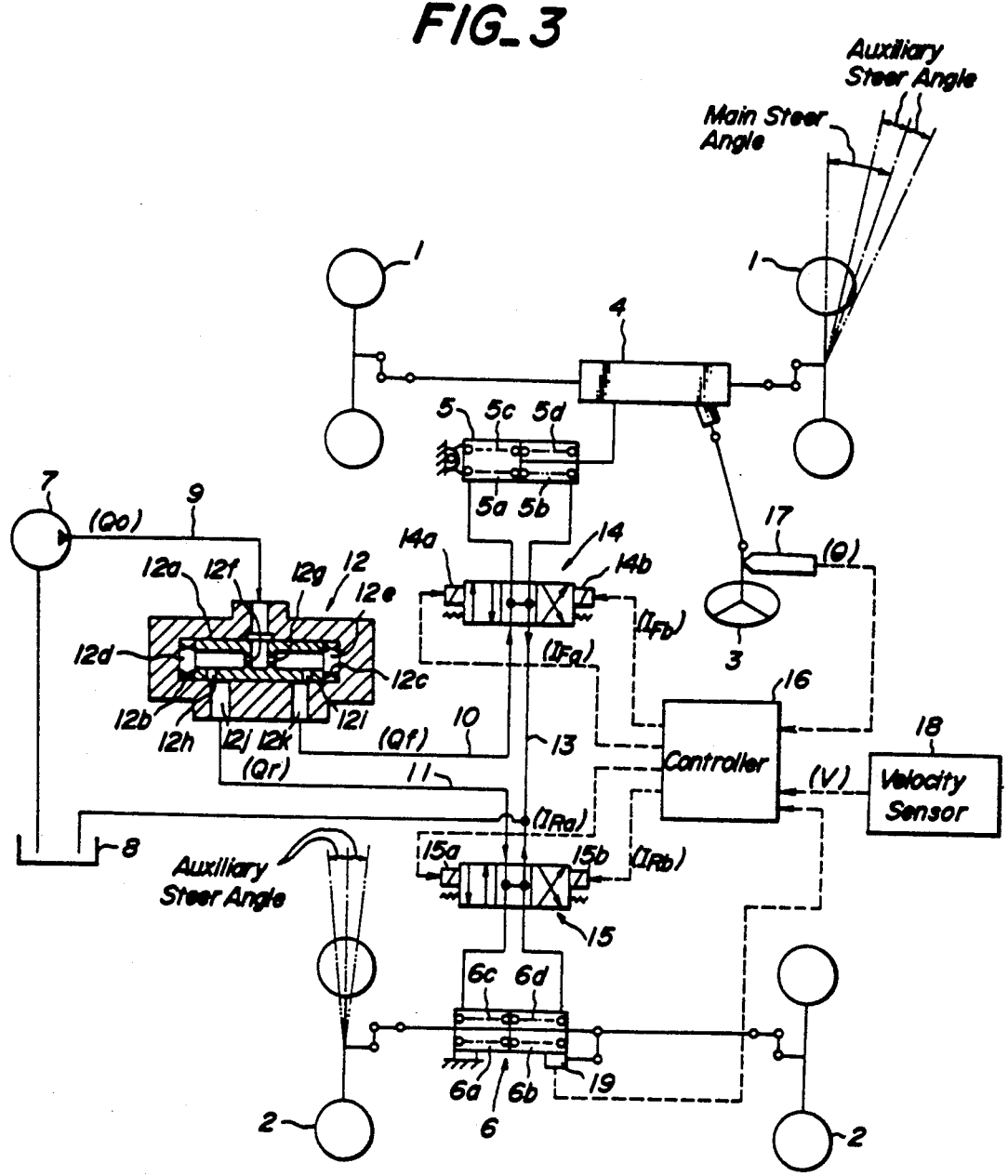
FIG. 3 is a schematic view depicting an embodiment of the active steer angle control apparatus according to the invention.

FIG. 3 is a schematic view illustrating an embodiment of the steer angle active control apparatus according to the invention. Reference numerals 1 and 2 denote front wheels and rear wheels, respectively. The front wheels 1 can be steered into a desired direction by transferring a steering input applied to a steering wheel 3 to the front wheels 1 via a steering gear 4 so as to perform a usual main steering control. In order to perform the active steer angle control for the front wheels 1, a housing of the steering gear 4 is linearly moved by an actuator 5 of an auxiliary steer angle control apparatus. The front wheels 1 can be steered auxiliarily by the auxiliary steer angle control up to the maximum steer angle $\alpha$. In this embodiment, the steer angle of the rear wheels 2 is also controlled actively. That is to say, the steer angle of the rear wheels 2 can be actively controlled up to the maximum angle $\beta$ by means of an actuator 6 provided in a rear wheel steering apparatus. In the present embodiment, it is assumed that $\alpha > \beta$.

The apparatuses for controlling the steer angles of the front and rear wheels comprise, in addition to the respective actuators 5 and 6, a common pressure source formed by an oil pump 7, distributing valve 12 and steer angle controlling valves 14 and 15. The oil pump 7 sucks oil in a reservoir tank 8 and discharges the sucked oil into a main circuit 9. The oil discharged into the main circuit 9 is delivered by the distributing valve 12 into a front wheel steer angle auxiliarily controlling circuit 10 and a rear wheel steer angle auxiliarily controlling circuit 11.

In the distributing valve 12, a shuttle spool 12a is resiliently supported into a neutral position by means of springs 12b and 12c and pressure chambers 12d and 12e are formed on both sides of the shuttle spool. These pressure chambers 12d and 12e are communicated with the main circuit 9 by means of orifices 12f and 12g, respectively which have different diameters and are formed in the shuttle spool 12a. The pressure chambers 12d and 12e are further communicated with rear and front wheel steer angle auxiliarily controlling circuits 11 and 10 by means of openings 12h and 12i, respectively formed in the shuttle spool and output ports 12j and 12k, respectively formed in a holding of the distributing valve 12. When the shuttle spool 12a is moved in accordance with a pressure difference between the pressure chambers 12d and 12e, the communication degrees between the openings 12h and 12i and the output ports 12j and 12k, respectively are changed in opposite senses to perform the adjustable distribution of the oil.

Now a required flow rate $Q_f$ of the oil for the circuit 10 will be considered. The required flow rate $Q_f$ may be expressed by a product between a pressure receiving surface area $S_A$ of a piston of the actuator 5 which actively controls the steer angle of the front wheels 1 and a moving speed V of the piston ($Q_f = S_A \times V$). The moving speed v of the piston of the actuator 5 can be expressed by $v = 2 \times f \times d$, wherein f is a frequency of the active steer angle control signal for the front wheels 1 and d is a stroke of the piston. Then, $Q_f = S_A \times 2\pi \times f \times d$ is obtained. In a similar manner, a required flow rate $Q_r$ of the oil for the circuit 11 for actively controlling the steer angle of the rear wheels 2 can be obtained. Since the discharge rate $Q_O$ of the oil pump 7 may be expressed by an equation of $Q_O = Q_f + Q_r$, a distribution ratio for obtaining the required flow rates $Q_f$ and $Q_r$ is achieved by setting the diameters of the orifices 12g and 12f in accordance with ratios of $Q_f/Q_O$ and $Q_r/Q_O$, respectively. In this manner, the distributing valve 12 can deliver the oil into the circuits 10 and 11 at the required flow rates $Q_f$ and $Q_r$. Further, when the oil pressure in the circuit 10 or 11 is changed due to the variation of the flow rate, the shuttle spool 12a of the valve 12 is moved rightward or leftward so that the opening 12i or 12h is closed by the inner wall of the housing. In this manner, it is possible to prevent the balance of the flow rate ratio from being disturbed, and thus the pressure variation in one circuit gives no influence upon the other circuit.

The active steer angle control is carried out by controlling the steer angle control valves 14 and 15, while the pressure variation in one circuit does not affect the pressure in the other circuit as explained above.

Each of the steer angle control valves 14 and 15 is constructed by a pressure control valve which is provided between the auxiliary steer angle control circuit 10 and 11 and the actuators 5 and 6, respectively. The valves 14 and 15 are further provided between the actuators 5 and 6 and a common drain circuit 13.

When solenoids 14a and 14b in the control valve 14 are not energized, all the oil supplied from the circuit 10 is fed back into the drain circuit 13 and chambers 5a and 5b of the actuator 5 are kept at a non-pressure state. Then, the actuator 5 is held in a neutral position by means of springs 5c and 5d provided therein, so that the steering gear 4 is driven into a condition in which the steer angle of the front wheels 1 is not actively controlled. When the solenoid 14a is energized, the valve 14 functions to increase the pressure in the chamber 5a and the chamber 5b is drained, so that the actuator 5 is extended. Then, the steering gear 4 is moved rightward in FIG. 3 and the front wheels 1 are auxiliarily steered leftward within said maximum angle $\alpha$. When the solenoid 14b is energized, the chamber 5b is compressed and the chamber 5a is drained, so that the length of the actuator 5 is shortened and the steering gear 4 is moved leftward. Then, the front wheels 1 are steered rightward within the maximum angle $\alpha$. In this manner, the steer angle of the front wheels 1 is actively controlled.

The construction and operation of the rear wheel active control apparatus including the steer angle control valve 15 and actuator 6 for actively controlling the steer angle of the rear wheels 2 are the same as those explained above.

That is to say, the steer angle control valve 15 comprises solenoids 15a and 15b, and the actuator 6 includes chambers 6a, 6b and springs 6c and 6d. When both the solenoids 15a and 15b are de-energized, both the chambers 6a and 6b are kept in the non-pressure state. But when the solenoid 15a is energized, the pressure in the chamber 6a is increased and when the solenoid 15b is driven, the pressure in the chamber 6b is increased, so that the steer angle of the rear wheels 2 can be actively controlled within the maximum angle $\beta$.

The solenoids 14a, 14b of the valve 14 and the solenoids 15a, 15b of the valve 15 are on-off controlled by a controller 16, to which are supplied a steering wheel angle signal generated from a steering wheel angle sensor 17 for detecting a steering angle $\theta$ of the steering wheel 3, a running velocity signal produced by a running velocity sensor 18 for detecting a running velocity V of the vehicle, and a signal generated by a stroke sensor 19 for detecting a stroke of the rear wheel actuator 6.

The controller 16 comprises an input detecting circuit, a calculating circuit, a memory circuit for storing a steer angle controlling program which is executed in the calculating circuit, and an output circuit for sending control signals to the steer angle controlling valves 14 and 15. The calculating circuit derives the auxiliary steer angle control signals for the front and rear wheels 1 and 2 in accordance with the above mentioned parameters detected by the sensors and the output circuit supplies on-off control signals $I_{Fa}$, $I_{Fb}$, $I_{Ra}$ and $I_{Rb}$ to the solenoids 14a, 14b, 15a and 15b, respectively of the steer angle controlling valves 14 and 15.

The auxiliary steer angle control amounts $\delta_f$ and $\delta_r$ for the front and rear wheels 1 and 2, respectively are calculated in accordance with the operating conditions of the steering wheel 3 (steering wheel angle $\theta$ and angular velocity $\theta'$ of the angle $\theta$) and the running velocity V of the vehicle. In the present embodiment, the angular velocity of the steering wheel angle $\theta$, i.e. a first order differential of the steering wheel angle $\theta'$ is utilized as a transient component, the auxiliary or active steer angle control amounts $\delta_f$ and $\delta_r$ may be calculated in the following manner.

$$\delta_f K_{f(V)} \times \theta \times T_{f(V)} \times \theta' \tag{1}$$

$$\delta_r K_{r(V)} \times \theta \times T_{r(V)} \times \theta' \tag{2}$$

Here, $K_{f(v)}$ and $K_{r(v)}$ are coefficients for $\theta$ in the proportional term and vary in accordance with the running velocity V of the vehicle, and $T_{f(v)}$ and $T_{r(v)}$ are coefficients for $\theta'$ in the differential term and also vary in accordance with the running velocity V of the vehicle.

Each of the above mentioned equations (1) and (2) has the proportional term (first term) and the differential term (second term). That is to say, during the transient period of the steer angle active control ($\theta$ is small, but $\theta'$ is large), a sharp characteristic is obtained by the differential term and during a steady state period ($\theta$ is large, but $\theta'$ is small), the stability is realized by the proportional term.

Further, the polarity of the coefficient $T_{r(v)}$ in the differential term of the second equation (2) becomes positive or negative to perform a so-called phase reverse control for the rear wheels. The controller 16 is constructed such that when the steer angle of the rear wheels 2 is actively controlled, the steer angle of rear wheels 2 is increased in the same sense as the front wheels 1 within a predetermined threshold value of the steering wheel angle, and when the steering wheel is driven over the threshold value, the steer angle of the rear wheels 2 is increased in the opposite sense to that of the front wheels. It should be noted that when the front and rear wheels 1 and 2 are directed to the same direction, the steer angle of the rear wheels in this direction is decreased.

According to the invention, the controller 16 also serves to correct at least the active steer angle control amount for the front wheels 1 under the high lateral acceleration in order to improve the maneuverability of the vehicle. To this end, in the present embodiment, the controller 16 detects the physical amount corresponding to the lateral acceleration from the running velocity V of the vehicle and the steering wheel angle $\theta$. It should be noted that there may be arranged a sensor for directly detecting the lateral acceleration. When the physical amount corresponding to the lateral acceleration is large, the differential component is increased. That is to say, the coefficient in the differential term is changed in accordance with the lateral acceleration such that the reduction in the cornering power in case of the turning under the high lateral acceleration can be compensated for.

It is preferable to correct also the coefficient in the proportional term in the active control amount for controlling the steer angle of the front wheels 1 in accordance with the lateral acceleration in addition to the correction for the coefficient in the differential term.

Further, it is preferable to correct the coefficients in the proportional term and/or differential term in the active control amount for controlling the steer angle of the rear wheels 2.

In the present embodiment, in the memory circuit of the controller 16 there is stored a table data of weights for effecting the above mentioned correction.

Figure 4:
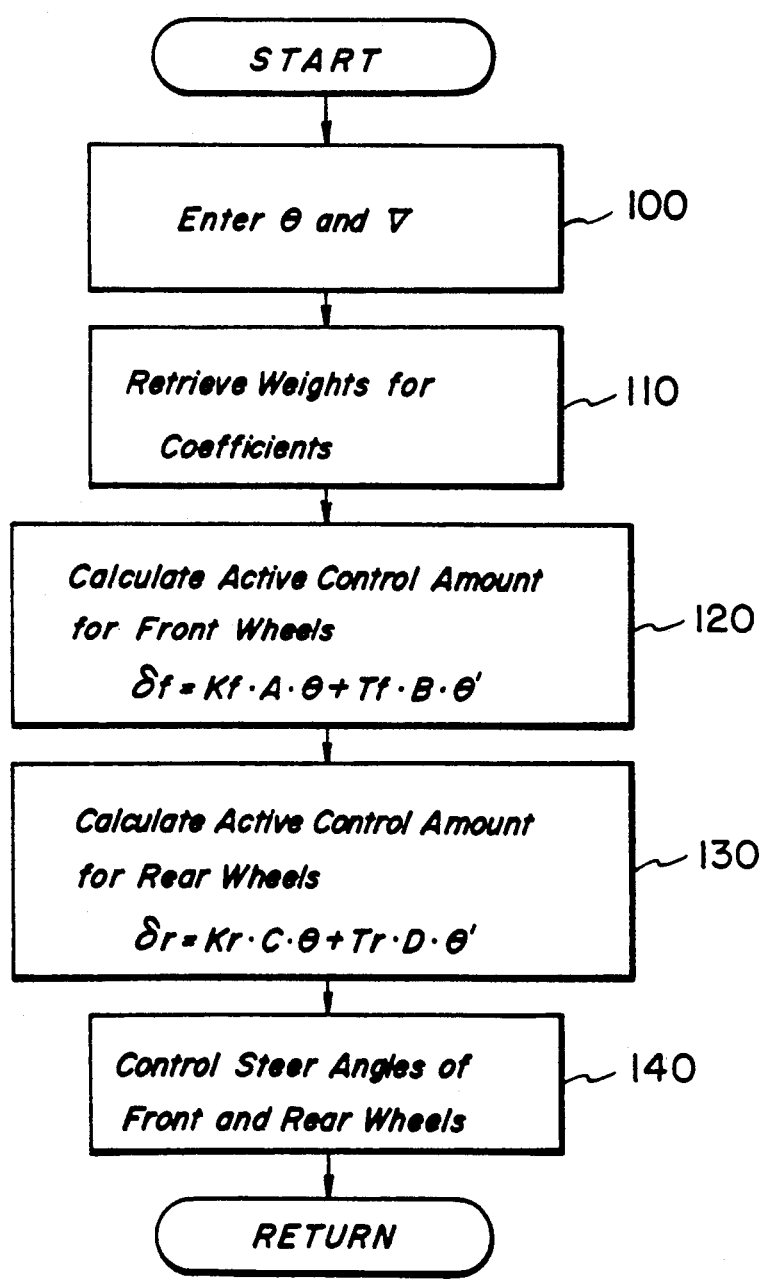
FIG. 4 is a flow chart representing the operation of the apparatus shown in FIG. 3.

FIG. 4 is a flow chart representing a program for controlling the steer angle of the front wheels according to the invention. This program is executed repeatedly at a predetermined period.

In a step 100, the steering wheel angle $\theta$ generated by the sensor 17 and the running velocity V detected by the sensor 18 are entered. In a next step 110, weight coefficients for correcting the active steer angle control amount are retrieved in accordance with the physical amount corresponding to the lateral acceleration, i.e. lateral G. In the present embodiment, the active control amounts for controlling the steer angles of the front and rear wheels are derived by the following equations (3) and (4):

$$\delta_f = K_{f(v)} \times A \times \theta + T_{f(v)} \times B \times \theta' \quad (3)$$

$$\delta_r = K_{r(v)} \times C \times \theta + T_{r(v)} \times D \times \theta' \quad (4)$$

In the above equations, A to D are weights for correcting the coefficients in the equations for calculating the active control amounts for the front and rear wheels in accordance with the lateral acceleration. Now the method of determining the correcting weights A to D will be explained also with reference to a graph shown in FIG. 5. According to the invention, the lateral acceleration may be directly detected and the thus detected lateral acceleration may be entered in the step 110. However, in the present embodiment, the lateral force applied to the vehicle is calculated from the steering wheel angle $\theta$ and running velocity V of the vehicle. That is to say, as illustrated in FIG. 5 there is formed a table which represents the relationship between the coefficient correcting weights and the steering wheel angle and running velocity, and desired correcting weights are retrieved from the table in accordance with the detected steering wheel angle and running velocity. In this table, the horizontal axis denotes the steering wheel angle $\theta$ and the vertical axis represents the correcting weights A to D. For instance, the correcting weight B for the coefficient included in the differential term for calculating the transient component for actively controlling the steer angle of the front wheels in accordance with the first order differential of the steering wheel angle will be considered. The correcting weight B remains 1.0 until the steering angle $\theta$ reaches a predetermined value and then is increased in proportion to the steering wheel angle. In FIG. 5, a point at which the control is changed is denoted by $B_O$. The correcting weight B is also dependent upon the running velocity of the vehicle and said point $B_O$ is shifted toward the smaller steering angle side in proportion to the increase in the running velocity as shown by an arrow in FIG. 5. That is to say, the correcting weight curve B is parallelly shifted dependent upon the running velocity of the vehicle. Similarly, the correcting weight A for the proportional component of the active control amount for controlling the steer angle of the front wheels and the correcting weight D for the differential component in the active control amount for controlling the steer angle of the rear wheels are kept constant up to points $A_O$ and $D_O$ and then are linearly increased in proportion to the steering wheel angle $\theta$. The correcting weight C for the proportional component of the active control amount for controlling the steer angle of the rear wheels remains 1.0 up to a point $C_O$ and then is decreased in proportion to the increase in the steering wheel angle $\theta$. These points $A_O$, $C_O$ and $D_O$ are also shifted toward the smaller steering wheel angle side dependent upon the increase in the running velocity of the vehicle. This is due to the fact that when the running velocity of the vehicle is increased, a threshold steer angle for judging the high lateral G turning becomes smaller.

In the present embodiment, all the weights A to D for the coefficients in the proportional and differential terms of the equations for calculating the active control amounts for controlling the steer angles of the front and rear wheels are corrected in accordance with the physical amount which corresponds to the lateral acceleration, i.e. lateral G applied to the body of the vehicle, and therefore, the reduction in the cornering power under the high lateral G turning can be compensated for. Thus, the head turning property can be improved under any conditions such as the turning from the straight-ahead and the turning during the turning movement, and the stability and drive feeling properties can be improved.

In order to improve the head-turning characteristic under the high lateral G turning, the following three methods may be considered:

(a) The steer angle of the rear wheels is controlled in accordance with the steering wheel angle such that the steer angle of the rear wheels is increased in the opposite sense.

(b) The steer angle of the rear wheels is controlled by the differential of the steering wheel angle in the opposite sense.

(c) The steer angle of the front wheels is controlled in accordance with the steering wheel angle in the same sense.

In the first and second methods (a) and (b), the steer angle of the rear wheels is increased in the opposite sense so as to improve the head-turning characteristic. Therefore, the tail of the body is swung outwardly, and thus the feeling of on the rail could hardly be obtained. In the third method (c), the above mentioned problem in the methods (a) and (b) does not occur, but the response is inferior and the road holding impression could not be attained particularly at an initiation of the steering wheel operation.

Figure 1:
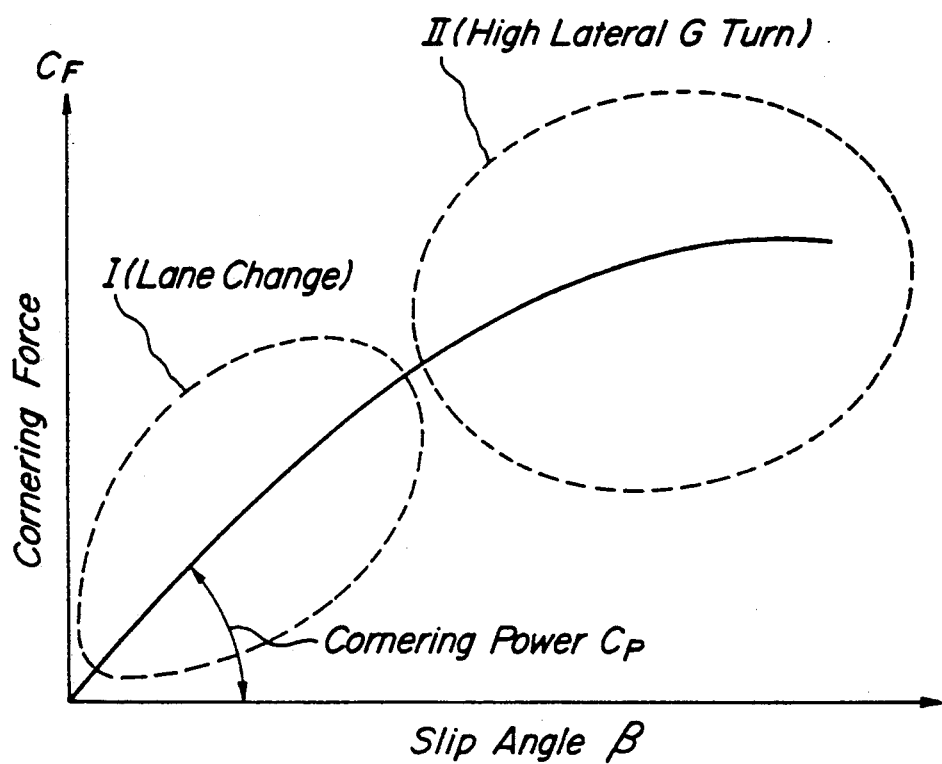
FIG. 1 is a graph showing the mutual relationship between the side slip angle and the cornering force of the known active steer angle control apparatus.

According to the invention, at least the weight B for the coefficient in the equation for calculating the differential component of the active control amount for controlling the steer angle of the front wheels is corrected or changed in accordance with the physical amount corresponding to the lateral acceleration, so that the response and the drive feeling can be improved as compared with the above mentioned methods (a) to (c). When said coefficient is set such that the optimum active control can be obtained in the range I in FIG. 1, the weight B for this coefficient is increased under the high lateral G condition, i.e. in the region II, so that the decrease in the cornering force is compensated for and the stability and road holding can be enhanced.

In the step 110 in FIG. 4, desired weights A to D in the equations (3) and (4) are selected in accordance with the steering wheel angle and running velocity of the vehicle, and in steps 120 and 130, the active control amounts $\delta_f$ and $\delta_r$ are calculated by using the thus selected weights A to D. In a next step 140, the steer angles of the front and rear wheels are controlled actively in accordance with the thus calculated active control amounts $\delta_f$ and $\delta_r$.

In this manner, according to the invention, by correcting at least the coefficient in the equation for calculating the differential component of the active control amount for actively controlling the steer angle of the front wheels in accordance with the physical amount corresponding to the lateral acceleration, the reduction in the cornering power due to the non-linearity of the tires under the high lateral G condition can be suitably compensated for and thus the response and the stably during the high lateral G turning can be improved. Further, by correcting not only the coefficient correcting weight B, but also the coefficient correcting weight D in the active control amount for the rear wheels, it is possible to adjust the ratio of the contribution to the head-turning property by the front wheel steer angle control to that by the rear wheel steer angle control can be precisely adjusted and the versatility can be increased.

As explained above, according to the invention at least the coefficient in the equation for calculating the differential component of the active control amount for controlling the steer angle of the front wheels is corrected in accordance with the physical amount corresponding to the lateral acceleration. There may be conceived many combinations of the coefficient correcting weights. For instance, the following modes for correcting the coefficient or coefficients may be conceived:

(1) weight B
(2) weights B and A
(3) weights B and D
(4) weights B and C

The modes (1) to (3) are based on the compensation for the reduction in the cornering power of the tires, and the mode (4) including the correction for the weight C is based on the recognition that the steady state component is increased by decreasing the same phase component in the active control amount for the rear wheel. In any mode, a large difference in the behavior of the vehicle between the straight-running and the high G running can be reduced.

In the above embodiment, the points $A_0$ to $D_0$ are set at different points as illustrated in FIG. 5, but according to the invention, these points may be set on the same point. While the vehicle is running at a constant steer angle, even when the running velocity is changed, the weights A to D are set not to be changed abruptly and further the abrupt change in the coefficients is suppressed. Then, the precise control can be performed even by changing the coefficients in accordance with the steering wheel angle and running velocity of the vehicle.

According to the invention, the coefficients in the equations for calculating the active control amounts can be changed in accordance with the directly detected lateral acceleration. FIG. 6 is a graph showing a retrieval table which represents the relation between the coefficients A to D and the lateral acceleration $Y_g$. In this case, coefficient changing points are not shifted in accordance with the running velocity of the vehicle.

As explained above in detail, according to the invention, at least the coefficient of the differential term in the equation for calculating the active control amount for actively controlling the steer angle of the front wheels is corrected in accordance with the physical amount corresponding to the lateral acceleration such that when the lateral acceleration is large, said coefficient is increased to compensate suitably the reduction in the cornering power due to the non-linearity of the tires. Therefore, the stability and response under the high lateral acceleration can be improved and thus the head-turning property under the high lateral G can be improved.

I claim:

1. An apparatus for controlling a steer angle of front wheels of a vehicle comprising:
   first sensing means for detecting a condition of a steering wheel to derive a steering wheel angle signal;
   main signal processing means for deriving a main steer angle control signal in accordance with said steering wheel angle signal;
   main steering means for steering the front wheels in accordance with said main steer angle control signal;
   auxiliary signal processing means for processing said steering wheel angle signal to derive an active steer angle control signal including a proportional component and a differential component;
   second sensing means for detecting a physical amount corresponding to a lateral acceleration applied to the vehicle;
   correcting means for correcting a coefficient in an equation for calculating the differential component of said active control signal in such a manner that said coefficient is increased in accordance with an increase in said physical amount corresponding to the lateral acceleration; and
   auxiliary steering means for controlling the steer angle of the front wheels in accordance with said active control signal having the differential component with the coefficient which has been corrected by said correcting means.

2. An apparatus according to claim 1, wherein the apparatus further comprises third sensing means for detecting a running velocity of the vehicle and said second sensing means for detecting the physical amount is constructed such that said physical amount corresponding to the lateral acceleration is derived from the steering wheel angle and said running velocity of the vehicle.

3. An apparatus according to claim 1, wherein said correcting means is constructed such that in addition to said coefficient in the equation for calculating the differential component of the active control amount for actively controlling the steer angle of the front wheels, a coefficient in the equation for deriving the proportional component of the active control amount for actively controlling the steer angle of the front wheels is also changed in accordance with the physical amount corresponding to the lateral acceleration.

4. An apparatus according to claim 1, wherein said correcting means is constructed such that in addition to the coefficient in the equation for calculating the differential component of the active control amount for actively controlling the steer angle of the front wheels, a coefficient in an equation for deriving a proportional component of an active control amount for actively controlling a steer angle of rear wheels of the vehicle is also changed in accordance with the physical amount corresponding to the lateral acceleration.

5. An apparatus according to claim 1, wherein said correcting means is constructed such that in addition to the coefficient in the equation for calculating the differential component of the active control amount for actively controlling the steer angle of the front wheels, a coefficient in an equation for deriving a differential component of an active control amount for actively controlling a steer angle of rear wheels of the vehicle is also changed in accordance with the physical amount corresponding to the lateral acceleration.

6. An apparatus according to claim 5, wherein said coefficient in the equation for calculating the active control amount for actively controlling the steer angle of the rear wheels is changed in an opposite sense to that of the coefficient in the equation for calculating the active control amount for the front wheels.

7. An apparatus according to claim 1, wherein said second sensing means is constructed to detect directly the lateral acceleration of the vehicle.

8. An apparatus according to claim 1, wherein said correcting means corrects said coefficient in such a manner that said coefficient remains constant up to a threshold point of the steering angle signal and is then increased in accordance with an increase in the steering wheel angle, said threshold point being shifted toward a smaller steering wheel angle in proportion to an increase in a running speed of the vehicle.

9. An apparatus according to claim 1, wherein said correcting means corrects said coefficient in such a manner that said coefficient remains constant up to a threshold point of the steering wheel angle signal and is then increased in accordance with an increase in the lateral acceleration.

10. An apparatus according to claim 9, wherein said second sensing means comprises a sensor for directly sensing the lateral acceleration of the vehicle.

11. An apparatus according to claim 9, wherein said second sensing means comprises a sensor for sensing a running speed of the vehicle, and said lateral acceleration is derived from the thus detected running speed of the vehicle and said steering wheel angle signal.

* * * * *